Patented Apr. 21, 1931

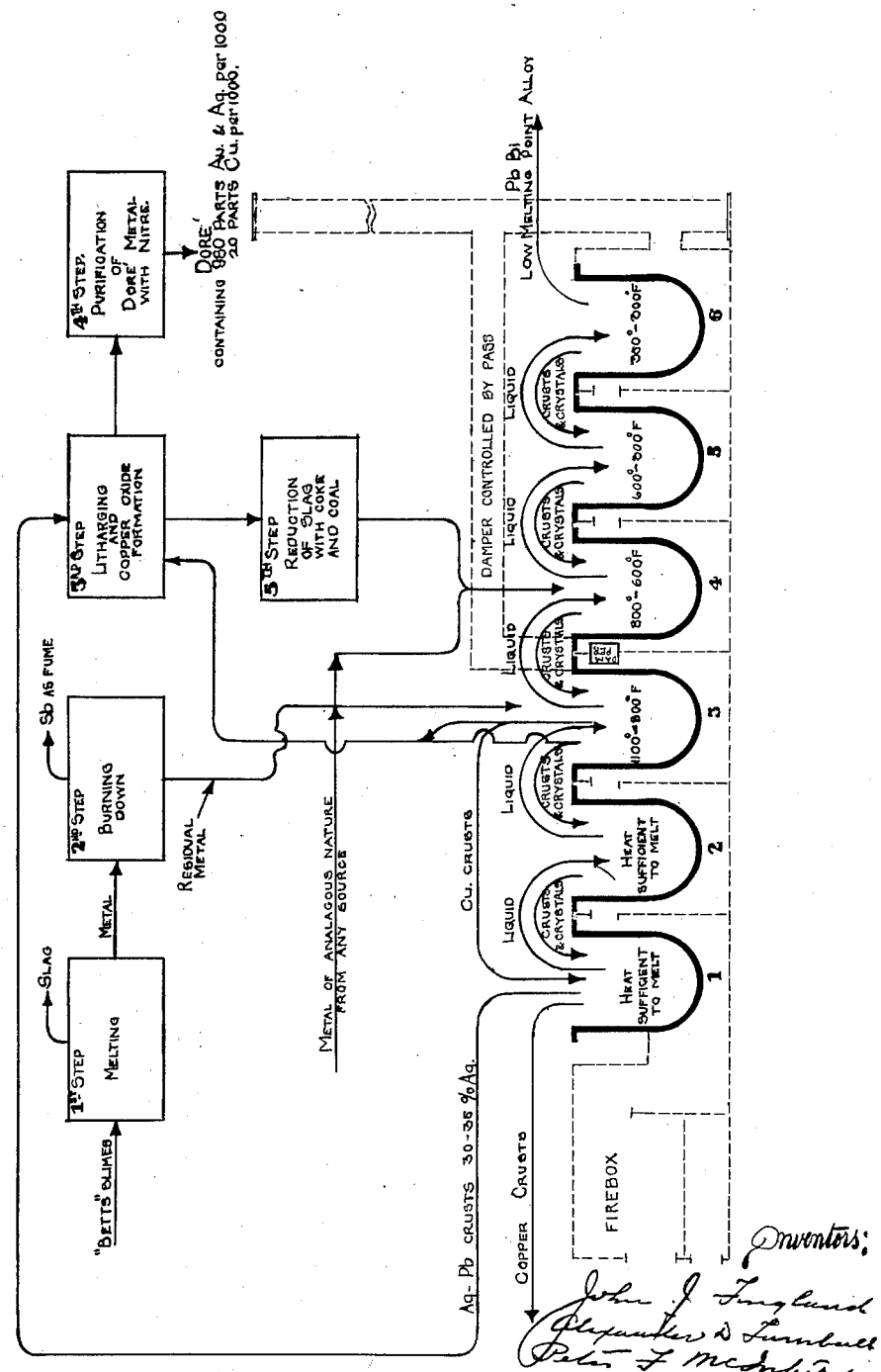

1,801,339

UNITED STATES PATENT OFFICE

JOHN JAMES FINGLAND, ALEXANDER DOUGLAS TURNBULL, AND PETER FINDLAY McINTYRE, OF TRAIL, BRITISH COLUMBIA, CANADA, ASSIGNORS TO THE CONSOLIDATED MINING AND SMELTING COMPANY OF CANADA LIMITED, OF MONTREAL, QUEBEC, CANADA, A CORPORATION OF CANADA

PROCESS OF EXTRACTING OR RECOVERING METALS FROM THE SLIMES OR RESIDUES OF ELECTROLYTIC LEAD-REFINING OPERATIONS

Application filed June 5, 1929. Serial No. 368,729.

In the electrolytic refining of lead, any bismuth, arsenic, antimony, copper, gold or silver, contained in the bullion is found, together with some of the lead, in the slimes or residues resulting from the electrolytic action and the usual refining procedure, for the recovery of the contained gold and silver, and the conversion of the base metals into products suitable for the separation and recovery of their metallic contents, involves the following steps or operations:

1. Melting the slimes or residues

During this stage of the procedure some of the antimony and arsenic are eliminated as fume, and a further portion of these metallic elements together with some lead and any tin present form a slag on the surface of the molten charge.

2. Burning off the antimony and arsenic

During this stage of the procedure the major proportions of the arsenic and antimony, which passed to the metal during the melting of the charge, are eliminated by oxidation aided by an air current or jet.

3. Litharging and producing copper oxide slags

After the antimony and arsenic are eliminated as fume, the air current or jet aids in the production of litharge slags which, as the lead is gradually eliminated from the molten charge, carry increasing proportions of copper. Towards the end of the oxidation, copper oxide slags are produced and any bismuth contained in the charge treated is concentrated in the later copper oxide slags and to a small extent in the litharges.

4. Rectification of the residual metal with nitre for elimination of the last proportion of impurities present A copper-bismuth product containing lead and silver is undesirable in a copper blast furnace, as bismuth may be introduced into the resultant copper in harmful proportions, and various expedients have been adopted to separate the bismuth from the copper prior to the return of the copper oxide slags to the copper metallurgical system. One of these expedients consists of heating the copper oxide slag with sufficient sulphur bearing material and carbonaceous matter for the production of copper matte and a crude lead-bismuth alloy. Other expedients consists of, submitting the lead bullion to a preliminary treatment for the separation of the lead from all metals except bismuth and recovering a relatively pure bismuth residue for subsequent electrolysis when the bismuth content is more than sufficient to pay for the cost of this double refining, and these expedients add materially to the cost of recovering or extracting the metals.

According to our invention we melt the slimes or residues from the electrolytic refining of lead and by successive graduated coolings effect the separation of the metals and concentrate the lead and bismuth as a lead-bismuth alloy and thus overcome the necessity of double refining, and the metallurgical difficulties arising from the presence of bismuth in the molten charge. To this end we introduce a special step into the ordinary sequence of the operation which results in the concentration of the lead and bismuth by the bismuth present combining with a proportion of the contained lead and forming a lead-bismuth alloy of low freezing point, such that it will remain in a liquid state substantially free from other metals, when sufficiently cooled to allow of the solidifying metals to be removed in the form of crusts or crystals from the surface of the liquid bath.

The concentration of the lead and bismuth as a low freezing lead-bismuth alloy may be conveniently effected after the major proportions of the antimony and arsenic have been eliminated from the molten charge, and, may be accomplished in one operation. Better results, however, are obtained by carrying out a series of partial separations coincidently in several suitable receptacles for the concentration of the silver contents of the molten charge at one end of the system and lead-bismuth alloy substantially free from silver at the other, as the mechanical entanglements of the liquid lead-bismuth with the crusts containing the solidifying metals and impurities are reduced to a minimum and any irregularities in the proportion of the metals present in the molten charge, such as an insufficiency of lead to form the lead-bismuth alloy and satisfy the lead requirements of the crusts, may be remedied by remelting the initial crusts with the addition of lead for the recovery of any bismuth which may pass to the crusts, through that deficiency.

These crusts may be conveniently segregated at the third stage of the procedure as follows:—

1. The copper carrying crusts which separate initially at the first cooling of the molten charge, and contain the major proportions of the copper content, and some proportion of lead, silver, arsenic and antimony but contain only a small proportion of bismuth. Such crusts treated separately give copper oxide slags which owing to the absence of bismuth are amenable to direct return to the copper metallurgical system.

2. The lead silver crusts which separate on subsequent cooling of the molten charge, and contain only small proportions of copper, arsenic and antimony, but have a bismuth content proportional to the amount of lead-bismuth alloy mechanically entrained, or arising through disproportionate amounts of the several metals present in the charge under treatment. Such crusts when treated separately from the copper crusts give litharge slags practically free from copper which can be reduced to metal by melting with coke breeze or coal dust and returned to the cycle of operation for the recovery of the lead-bismuth alloy, either alone or together with an incoming charge, or introduced at any suitable stage of the crust elimination procedure above outlined. By this procedure the bismuth contents of the original charge are finally eliminated in the form of a lead-bismuth alloy from which the bismuth and the lead can be recovered by known methods. The copper contents are recovered in slags of sufficient purity to allow them to pass to the copper metallurgical system, thus making the separation of the metallic contents of the original charge more complete than had hitherto been possible without the addition of this special step.

As shown diagrammatically in the accompanying drawing, the equipment employed for the carrying out of this particular bismuth elimination step may consist of a battery of six five-ton kettles, at one end of which is a firebox for producing the necessary heat, with provision for the hot gases passing around each kettle in succession and to the stack. A damper-controlled by-pass flue is provided at the third kettle which enables the operator to so adjust the heat that the products in each kettle are maintained in the liquid state. In operation, the first kettle may be maintained at 1100° F., while the sixth kettle will approximate 300°–400° F. according to composition of the metal treated.

The actual conduct of the operations coincident with this step are as follows:—The charge i. e. the residual metal from which the arsenic and antimony in great part have been eliminated as fume by the oxdizing treatment is introduced into the third kettle, usually in the molten state, and allowed to cool. The first crust, containing the copper crystals, is skimmed off and transferred to the first kettle for remelting, the elimination of the copper from the charge being determined visually by the disappearance of the black color of the crystals, or it may be transferred and treated separately in the third or litharging step of the operation. As the cooling proceeds the crust containing the silver-lead crystals is transferred to the second kettle where it is melted down and submitted to a like treatment, whereby the silver contents are enriched and the residual liquid metal containing bismuth is transferred again to the third kettle, this procedure being continued till the crusts contain 30–35% silver. The residual liquid from the initial charge in the third kettle passes to the fourth, fifth and sixth kettles in succession, in each of which the same operations are effected but at successively lower temperatures until the liquid metal in the last kettle of the series has a freezing point of 300°–350° F. The crusts formed in each kettle pass back to the hotter adjacent to it. The returned metal from the reduction of the litharge slags is ordinarily introduced into the fourth kettle after a preliminarily drossing and is treated in a like manner as above described with this exception, that owing to the higher proportion of lead which may be present in these metals and to the low proportion of silver which may be present, the crystals towards the final cooling stages may settle to the bottom of the charge instead of forming crusts on the surface. An air jet is ordinarily employed to agitate the charges in the kettles and maintain a uniform temperature in the bath during the cooling and crystal separation stages.

The following is an example of the actual results obtained by the direct treatment of about 130 tons of charge in which the bismuth contents were higher than those which correspond to the best practice. Only three products were made and the resultant intermediates are included in the lead silver crystals. In practice these would remain in the kettles to carry on the operations successfully, and it is to be noted that the very nature of the step makes it extremely difficult to secure representative samples of the resultant products.

| Metal to pots containing tons | | Copper crystal products | Lead silver products | Bismuth-lead crystals products |
|---|---|---|---|---|
| Pb | 38.31 | 4.62 | 19.96 | 13.84 |
| Cu | 10.53 | 5.07 | 4.25 | Trace |
| Bi | 29.05 | 3.71 | 15.14 | 9.68 |
| As | 2.07 | 0.51 | 0.79 | 0.08 |
| Sb | 10.58 | 2.67 | 6.00 | 0.03 |
| Sn | | | | |
| | Ounces | Ounces | Ounces | Ounces |
| Ag | 1,134,032 | 273,246 | 772,284 | 2,705 |
| Au | 2,459 | 618 | 1,557 | 90 |

Having thus fully described and ascertained the nature of our said invention what we claim as new and desire to secure by Letters Patent is:

1. A process of extracting or recovering metals from the slimes or residues of electrolytic lead refining operations which comprises melting a charge of such slimes or residues, subjecting the arsenic and antimony of the molten charge to oxidational treatment, slowly cooling the residual charge for concentrating the lead and bismuth content as a low freezing lead bismuth alloy substantially free from other metals and removing therefrom the resulting crust containing metals other than lead and bismuth.

2. A process of extracting or recovering metals from the slimes or residues of electrolytic lead refining operations which comprises melting a charge of such slimes or residues eliminating by oxidation the major proportion of the contained arsenic and antimony, slowly cooling the charge and effecting the separation of the crust containing the major proportion of the contained copper substantially free from bismuth, and further cooling the charge and effecting the separation of the major proportion of the contained silver together with some lead in the subsequent crusts for the concentration of the lead and bismuth as a low freezing lead-bismuth alloy substantially free from other metals.

3. A process of extracting or recovering metals from the slimes or residues of electrolytic lead refining operations which comprises melting the slimes and eliminating by oxidation the major proportions of the contained arsenic and antimony, cooling the molten charge for effecting the separation of the crust containing the copper substantially free from bismuth, further cooling the molten charge for effecting the separation of the major proportion of the contained silver, together with some lead collecting the litharge slags derived from the subsequent treatment of the lead-silver crusts and reducing them to metal by heating with carbonaceous matter, allowing the metal from the litharge slags to cool and separating the crusts formed until a low freezing residual liquid lead-bismuth alloy remains substantially free from the other metals.

4. A process of extracting or recovering metals from the slimes or residues of electrolytic lead refining operations, which comprises melting a charge of such slimes or residues eliminating by oxidation the major proportions of the contained arsenic and antimony, cooling the molten charge for effecting a separation of the crusts containing the major proportion of the copper, continuing the cooling for the separation of the lead-silver crusts until a partial separation of the bismuth is obtained as a residual liquid lead-bismuth alloy, collecting the litharge slags from the subsequent treatment of the silver-lead crusts, admixing the slags with excess carbonaceous matter and heating them for their reduction to metal, allowing the metal from the litharge slags to cool and effecting further separation of lead-silver crusts substantially free from bismuth, and collecting the bismuth contents as a low freezing lead-bismuth alloy substantially free from other metals.

5. A process of extracting or recovering metals from the slimes or residues of electrolytic lead refining operations, which comprises melting a charge of such slimes or residues eliminating by oxidation the major proportions of the contained arsenic and antimony subjecting the charge to an initial cooling maintained at an appropriate temperature for recovering the major proportion of the contained copper, and effecting a series of partial separations for the formation of lead silver crusts which are accumulated and re-melted and again submitted to a like cooling procedure for concentrating the silver contents at one end of the process and obtaining a residual liquid metal containing the bismuth at the other.

6. A process of extracting or recovering metals from the slimes or residues of electrolytic lead refining operations which comprises melting the slimes and eliminating by oxidation the major proportions of the contained arsenic and antimony, cooling the molten charge to appropriate temperatures for recovering the major proportion of the contained copper, effecting at lower temperatures a series of coolings of the residual contents of the original charge until the contained lead and silver are separated as crusts, subjecting the lead-silver crusts to a higher temperature and the residual liquid metal from them to a lower temperature until a low freezing liquid metal lead-bismuth alloy is obtained substantially free from other metals.

7. A process of extracting or recovering metals from slimes or residues of electrolytic lead refining operations which comprises melting a charge of the slimes eliminating by oxidation the major proportion of the combined arsenic and antimony, subjecting the molten charge to successive coolings graduated from the maximum to the minimum temperature of the procedure, removing the copper containing crusts at the initial cooling, continuing the cooling and removing the succeeding crusts containing lead-silver, transferring the lead-silver crusts to a receptacle at a higher temperature and remelting them with the residual liquid metal resulting from a previous treatment of lead-silver crusts at a still higher temperature, and continuing such treatments until a lead-silver crust is produced containing 30–35% of silver, subjecting the residual liquid metal from the separation of lead-silver crusts to treatments at lower temperatures and adding to it the crusts resulting from a like procedure at still lower temperatures and continuing such treatments until a residual liquid metal, containing the bismuth contents of the charge treated, and having a freezing point of 300° F. is secured substantially free from metals other than lead.

Signed at the said city of Trail, this 31st day of March, 1929.

JOHN JAMES FINGLAND.
ALEXANDER DOUGLAS TURNBULL.
PETER FINDLAY McINTYRE.